US010922151B2

(12) United States Patent
Lube et al.

(10) Patent No.: US 10,922,151 B2
(45) Date of Patent: Feb. 16, 2021

(54) UNIFIED EVENTS FRAMEWORK

(71) Applicant: SAP SE, Walldorf (DE)

(72) Inventors: Harry Lube, Hockenheim (DE);
Ritwik Chatterjee, Jharkhand (IN);
Aparajita, Bhagalpur (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/026,297

(22) Filed: Jul. 3, 2018

(65) Prior Publication Data

US 2020/0012541 A1     Jan. 9, 2020

(51) Int. Cl.
*G06F 9/54* (2006.01)
*H04L 29/08* (2006.01)
*G06F 9/48* (2006.01)

(52) U.S. Cl.
CPC .............. *G06F 9/542* (2013.01); *G06F 9/485* (2013.01); *H04L 67/12* (2013.01)

(58) Field of Classification Search
None
See application file for complete search history.

(56) References Cited

U.S. PATENT DOCUMENTS

| | | | | |
|---|---|---|---|---|
| 9,569,255 B1* | 2/2017 | Johnson | ................ | G06F 9/4887 |
| 10,282,790 B1* | 5/2019 | Kolbrener | .............. | G06Q 40/12 |
| 2013/0074083 A1* | 3/2013 | Oliver | ..................... | G06F 9/542 |
| | | | | 718/102 |
| 2018/0035479 A1* | 2/2018 | Lee | ........................ | H04W 76/14 |
| 2018/0191867 A1* | 7/2018 | Siebel | ..................... | H04L 67/32 |
| 2018/0364654 A1* | 12/2018 | Locke | ................. | G05B 13/0265 |

\* cited by examiner

Primary Examiner — Tuan C Dao
Assistant Examiner — William C Wood
(74) *Attorney, Agent, or Firm* — Fish & Richardson P.C.

(57) ABSTRACT

Methods, systems, and computer-readable storage media for detecting and managing events from data of an Internet-of-Things (IoT) network, and actions can include receiving a first call from a first application, the first call including timeseries data from one or more IoT devices in a first IoT network, retrieving a rule set for processing the timeseries data, and determining that an anomaly is represented in the timeseries data based on the rule set, and in response, generating an event, the event having a configuration that is customized by an enterprise associated with the first application, executing an event workflow to transition the event between states, and transmitting an event response to the first application.

20 Claims, 4 Drawing Sheets

UNIFIED EVENTS FRAMEWORK

BACKGROUND

There has been a dramatic increase in the number of appliances, devices, utility devices, mechanisms, lighting fixtures, security devices, and/or other types of devices that are available for commercial, industrial, or home environments. In general, devices can include data collection, computing, sensing, and/or network communication capabilities in addition to their normal functionality. These devices may be described as smart appliances, smart vehicles, smart building components, smart infrastructure components, and so forth, and may also be described as Internet of Things (IoT) devices. The various devices may generate data, such as sensor data, status information, and so forth. Data may be shared among the devices over one or more wired or wireless networks using a variety of communication protocols to provide an IoT. In some instances, the devices may be sensed, and controlled remotely over network(s). The data generated by the devices may be collected, analyzed, or otherwise processed by computing devices, analytic cloud based IoT platforms, and/or individuals.

SUMMARY

Implementations of the present disclosure are directed to modeling, and configuring Internet of Things (IoT), industry-specific events, and event workflows. More particularly, implementations of the present disclosure are directed to a unified events framework that can be used to define customized events, tasks, requests, rules and/or event workflows for processing of timeseries data from IoT networks.

In some implementations, actions include receiving a first call from a first application, the first call including timeseries data from one or more IoT devices in a first IoT network, retrieving a rule set for processing the timeseries data, and determining that an anomaly is represented in the timeseries data based on the rule set, and in response, generating an event, the event having a configuration that is customized by an enterprise associated with the first application, executing an event workflow to transition the event between states, and transmitting an event response to the first application. Other implementations of this aspect include corresponding systems, apparatus, and computer programs, configured to perform the actions of the methods, encoded on computer storage devices.

These and other implementations can each optionally include one or more of the following features: the event is encapsulated in a package that defines the configuration of the event, and includes an event type, a property set, and a property set type of the event; an event type of the event is one of mutable, and immutable; during execution of the event workflow to transition the event between states, the event is mutable, and is overwritten at each state change; during execution of the event workflow to transition the event between states, the event is immutable, and a new event is generated and is correlated to the event at each state change; actions further include receiving a second call from a second application that is different from the first application, the second call comprising timeseries data from one or more IoT devices in a second IoT network associated with a second enterprise that is different from the first enterprise; and the first application is a cloud-based application.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
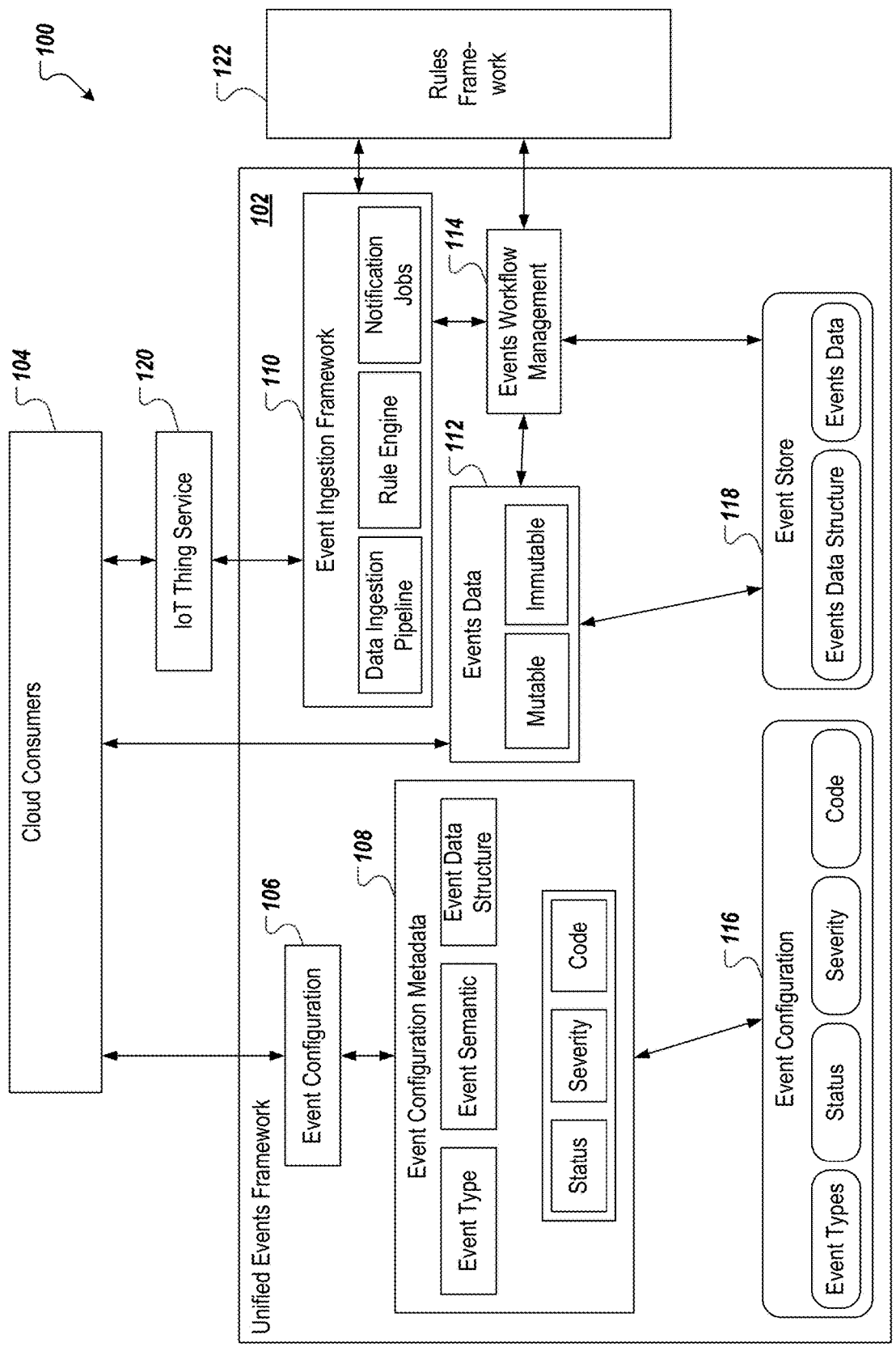
FIG. 1 depicts an example architecture including an example unified events framework in accordance with implementations of the present disclosure.

Implementations of the present disclosure are directed to modeling, and configuring Internet of Things (IoT), industry-specific events, and event workflows. More particularly, implementations of the present disclosure are directed to a unified events framework that can be used to define customized events, tasks, requests, rules, and/or event workflows for processing of timeseries data from IoT networks. Implementations can include actions of receiving a first call from a first application, the first call including timeseries data from one or more IoT devices in a first IoT network, retrieving a rule set for processing the timeseries data, and determining that an anomaly is represented in the timeseries data based on the rule set, and in response, generating an event, the event having a configuration that is customized by an enterprise associated with the first application, executing an event workflow to transition the event between states, and transmitting an event response to the first application.

The term IoT refers to an inter-networking of machines, sensors, smart devices, actuators, which enable collection, processing, and exchange of data. Data from IoT devices is primarily classified as "timeseries" data. With this data, the performance, correctness, efficiency, and/or behavior of an environment the IoT devices are responsive to, a machine (or sub-component(s) of a machine), and even the IoT device itself can be determined. However, to monitor and react to such criteria, a mechanism is needed to generate events, tasks, requests, and/or event workflows.

In view of this, implementations of the present disclosure provide a unified events framework that can be used to model and configure IoT, industry-specific events, and event workflows. Using the unified events framework of the present disclosure, cloud-based IoT users (e.g., enterprises) can define customized events, tasks, requests, rules, and/or event workflows. In some examples, and as described herein, these customizations are integrated with the timeseries data from an IoT network of a respective enterprise, and are used to identify changes (e.g., based on defined thresholds), and generate events and/or alerts (e.g., in database systems).

In some implementations, an event describes a data record generated by one or more IoT devices (e.g., machines, sensors) in response to user action, and/or change of data. In some examples, the data record is generated based on predefined rules, and/or thresholds applied to timeseries data received from an IoT network (e.g., indicating abnormal behavior of the timeseries data). To capture and classify the timeseries data as events, the unified events framework of the present disclosure enables custom modeling of the timeseries data. More particularly, the unified events framework enables a user (e.g., an agent of a particular enterprise) to define, persist and process the timeseries data as alerts, tasks, requests, events, and event workflows.

In some implementations, the unified events framework of the present disclosure enables definition of industry-specific event types. In some examples, event types are provided as configuration data, and define categorization of events. Custom, or user-specific event types can be defined, which provide user-flexibility in defining their own industry-specific events with event-specific semantics. In some implementations, event types can be further categorized as either mutable, or immutable. An event having an event type that is mutable can be overwritten, while an event having an event type that is immutable cannot be overwritten. In some implementations, the unified events framework has programmatic intelligence, and algorithms to process events that are mutable or immutable, and maintain their respective persistence behavior.

In some implementations, the unified events framework enables configurable statuses, severities, and/or codes, which can be referred to as semantics. In some examples, these semantics respectively define the characteristics, priority, and (business) acumen of an event.

As described in further detail herein, the unified events framework of the present disclosure enables any IoT-enabled industry to operate a complete event management system. Further, and depending on the modeling of events, and defined rules, the unified events framework can persist data into one or more database systems (e.g., SAP HANA) for quick access, and/or for generating event workflow. In some examples, by using the unified events framework, every model will have its own unique data structure, which is capable of persisting data in the one or more database systems. This can persist all types of event-specific additional data, which could be used for triggering a workflow, or service request, for example.

In some implementations, the unified events framework can be provided as a component of a larger platform. By way of non-limiting example, the unified events framework can be provided with the SAP IoT Application Enablement (IoT AE) provided by SAP SE of Walldorf, Germany. IoT AE can be described as a selection of microservices, and tools that enable customers to build IoT applications quickly, securely, and scalably based on their respective IoT networks.

FIG. 1 depicts an example architecture 100 including an example unified events framework (UEF) 102 in accordance with implementations of the present disclosure. As described in further detail herein, one or more cloud-based consumers 104 can access the UEF 102 to model, and configure customized (e.g., consumer-specific, and/or industry-specific) events, tasks, requests, rules, and/or event workflows. In some examples, a cloud-based consumer can include an enterprise that operates, or otherwise receives timeseries data from an IoT network.

In the example of FIG. 1, the UEF 102 includes an event configuration component 106, an event configuration metadata component 108, an event ingestion framework 110, an events data component 112, an events workflow management component 114, event configuration data 116, and event data 118. The example architecture 100 also includes an IoT thing service component 120, and a rules framework 122.

In general, the event configuration component 106, the event configuration metadata component 108, and event configuration data 116 enable event modeling, and configuration. More particularly, these components enable a user to model an event structure of an event. Accordingly, events can be customized for particular use cases, industries, and enterprises. In this manner, the UEF 102 of the present disclosure is agnostic to the particular type of IoT network, and enterprise operating the IoT network.

In some implementations, each modeling entity is encapsulated within a package. In some examples, a package is a virtual container for all configuration entities, and maintains the versioning and scope of the entities. In some examples, a package can have the following example scopes: private, tenant, protected. An entity that is assigned as a private scope within a package cannot be reused. However, events can be created using a private event type. An entity that is assigned as a tenant scope can be reused, but only within the same tenant. An entity that is assigned as a protected scope can be shared across multiple tenants. This, however, comes with a restriction that a target tenant, with which the entity is to be shared, has to be authorized by a source tenant. In some examples, if a scope is assigned to a package, all entities in the package inherit the same scope.

In some implementations, each package includes one or more event types. each event type is the semantic for a respective event. With non-limiting reference to Java object oriented programming (OOPS) concepts, an event type is a CLASS, and events created from an event type are instances. A user can model multiple event types within a package. In some examples, each event type has three main properties of status, severity, and code, as described herein.

In some implementations, each event includes a property set that corresponds to a property set type of the package. In some examples, the property set type is a data structure for persisting additional information for an event. For example, a property set type in IoT AE translates to a dynamic table structure in a database system (e.g., SAP HANA). In some examples, a property set is the relation between an event type, and the property set type of the event. The property set enables an event to persist data within the events dynamic data table. In some examples, each property set type includes a property type having a simple type, the simple type including one or more properties.

In some implementations, users (e.g., agents of respective enterprises) can define their own industry-specific data models to support event, and/or alert generation. Modeling entities include event type, event status, and event code. Using the event type, a user can classify a category of an event. As also discussed in further detail herein, an event type can also be categorized further as mutable, or immutable. In some examples, a mutable event can be overwritten. In some examples, an immutable event cannot be overwritten. This categorization of mutable, or immutable can result in the UEF 102 implementing different algorithms to manage specific event behavior. For example, a specific sequence of events and event statuses may be tracked. Consequently, events associated with the sequence can be categorized as immutable, and each can be associated with a correlation identifier (ID). In this manner, as an event in the sequence is generated, the correlation ID can be used to correlate the event to the modeled sequence of events, and any other already occurring events in the sequence, which have not been overwritten (i.e., because they are categorized as immutable).

In some implementations, the event status defines a current state of an event. For example, an event can have multiple states during its lifetime. In some examples, states can depend on a type of an event. For example, for an event that is modeled as a task, examples states can include, without limitation, new, in process, completed, and confirmed. As another example, for an event modeled as an alert (e.g., generated out of a device, or sensor), example states can include, without limitation, coming, going, and acknowledged. As another example, for an event can have two states, such as, TRUE/FALSE, OPEN/CLOSED.

The UEF 102 enables the states of an event to be modeled. These custom defined statuses can be provided in a table with language dependent explanations/descriptions of the context they are created for. The user can define multiple statuses during configuration. The statuses belong to the event type, and events generated of these event types can be assigned one or many of the statuses.

In some implementations, an event code is provided, and is used as an identifier representing a standard message-code, or notification-code. By way of non-limiting example, in SAP Enterprise Asset Management (EAM), there are message codes defined and structured in customizing that can be used in the business processes. These codes are custom defined values, usually reflected in a table with language dependent explanations/descriptions of the context they are created for. Event codes can be defined along with the event type.

In some implementations, event severity represents a relative magnitude, or importance of an event. In some examples, in response to generation of an event, or alert, a magnitude/importance of the event is determined. The event severity represents this, and can be used for downstream processing. For example, events can be queued for handling based on event severity (e.g., most severe events first), and/or different handling processes can be implemented (e.g., a first handling process for severe events, a second handling process for less severe events). Like status and code, a severity can be a custom defined value, and can be reflected in a table with language dependent explanations/descriptions of the context they are created for. Event severities can be defined along with the event type. Multiple severity values can be defined during the modeling of the event. When an event is subsequently generated, it can be assigned any one of the enumerated severity values.

In some implementations, an event type state indicates whether the event is mutable, or immutable. In some implementations, the event property set type is the data structure that models, and records additional information on a respective event. This can be related to a dynamic table, which is modeled at runtime, and is used to persist event data. In some examples, one or more relational database operations, and/or queries can be executed on this data structure. The data structure also supports creation of one or more column-based database tables, and can hold up to a threshold number of properties (e.g., 100 properties, each provided as a database table column). Example data types supported by the data structure include, without limitation: numeric, numeric flexible, string, Boolean, GUIID, partner, timestamp, date time, date, JavaScript object notation (JSON), LargeJSON, byte array, LargeString, and GeoJSON.

In general, the event ingestion framework 110, the events data component 112, the events workflow management component 114, and the event data 118 enable event generation, and management. More particularly, the UEF 102 not only provides the flexibility to define custom event models, as described above, but also events to be generated (e.g., alerts, tasks, requests, work items). In some examples, an event can be generated through an application (e.g., IoT AE) using an application programming interface (API). In some examples, an enterprise can leverage the automated event generation of the UEF 102 using the integrated rules framework 122.

In some implementations, the rules framework 122 can have multiple layers. Example layers include, without limitation, a design-time layer, and a runtime layer. In some examples, design-time includes a rules vocabulary that is based on a thing model, and includes types and properties. A semantic of each rule is defined, and actions and output objects are provided. The rules vocabulary acts as an interface for the consuming application, and the rules framework 122, and defines the underlying logic and actions that are to be performed in response to a rule being triggered. In addition, the rules vocabulary defines the group or type of things that the rule is applied to (e.g., a simple rule for upper and lower threshold limits, and an action can be defined for any value that crosses a threshold to generate an event). In some implementations, the runtime layer processes the machine or timeseries data coming in, and check data values against the rules. If the defined rule is found, and condition is met, then an event is generated.

As described herein, the UEF 102 is tightly integrated with a datastore, and rule engine, which enables the UEF 102 to detect any anomaly in the data from the IoT network (e.g., timeseries data, sensor data), and generate events (e.g., with IoT AE). In some examples, the persistency of the events can be modeled either in a so-called hot data store (e.g., in-memory database, such as SAP HANA), or a so-called warm data store (e.g., big data databased) depending on the data volume, and frequency of the events generated. For example, higher volume, more frequent events can use the hot data store, while lower volume, less frequent events use the warm data store.

In some implementations, the UEF 102 provides event lifecycle management (ELM). In some examples, ELM occurs from the inception (generation) of an event through to resolution of the event. In further detail, an event can exist in different states, and can be processed based on state. In some examples, ELM is maintained using a correlation ID, described above, in which multiple events can share the same correlation ID for different timestamps (e.g., an event at one time, can be correlated to another event at another time). Both mutable, and immutable events can maintain their own correlation IDs. By sharing the same correlation ID, an enterprise can maintain different states, severities, and codes for the same event, and maintain an event history. In some examples, events are processed based on their timestamp, and correlation ID. In some examples, the UEF 102 calculates the most-recent event based on the MAX of timestamp, and grouping unique correlation ID. The UEF 102 also provides the event history based on a requested correlation ID.

In some implementations, the UEF 102 maintains event persistency depending on the event type. As described herein, the event type is determined from the configuration defined for the event. In some examples, during POST of an event (both mutable and immutable), the correlation ID is optional. If a correlation ID is not provided, the application generates a 32-bit GUID as the correlation ID. If the event is defined as mutable, every new event that is generated is assigned a new correlation ID. Whenever there is a state change, the event is updated with the same correlation ID, and new timestamp. If the event is defined as immutable, each generated event is assigned a new correlation ID. Whenever there is a state change, a new event is generated and is assigned the same correlation ID, and new timestamp.

In some implementations, the UEF 102 generates events based on defined rules using the rules engine. The UEF 102 processes data from the IoT network (e.g., timeseries data, sensor data), retrieves rules from the rules framework 122, and selectively generates events. In some examples, events are automatically generated using scheduled event jobs. The UEF 102 also generates relevant event workflows. The scheduled event jobs manages the lifecycle of an event through an automated mechanism. In some examples, from the time the event is created, a notification is sent to all processors of the event. Multiple processors could be assigned for different state of an event. The notifications are series of tasks that are to be performed and acknowledged by the respective processors. The tasks can also be a part of an event workflow, which determines the sequence of the tasks and its completion dependency.

In general, an enterprise leverages its customized event detection, and management infrastructure provided by the UEF of the present disclosure. That is, an IoT network of the enterprise can transmit data to the UEF for processing. For example, one or more IoT devices of the IoT network sends data to an IoT edge computing device, which processes the raw data. In some examples, the IoT edge computing devices publish the data to a data pipeline. An example data pipeline can include a messaging system that is used to communicate data between applications. An example data pipeline can be provided using Kafka, which is provided by the Apache Software Foundation. Kafka can be described as a distributed streaming platform that enables messaging (e.g., queuing, publish-subscribe) for streaming data records, as well as real-time processing of the data records. In some examples, the data pipeline is provided as a cluster (Kafka cluster) on one or more servers, and stores streams of data records, each data record. In some examples, an application reads data from the data pipeline. For example, the IoT AE of the enterprise can subscribe to the data pipeline, and receive IoT data therefrom.

In accordance with implementations of the present disclosure, the application (e.g., IoT AE) makes a call to the UEF, which includes the timeseries data from the IoT network. In some examples, the event ingestion framework of the UEF retrieves relevant rules from the rules framework, and processes the timeseries data in view of the rules to identify any anomaly in the data. If an anomaly is detected, a call is made to the event store of the UEF, which generates an event.

In some implementations, events can be generated with different statuses (states) depending upon the configuration (e.g., new, in process, completed, confirmed; coming, going, acknowledged; true/false). For each state, a separate, respective event processing can be performed by an events handler. In some examples, the event handler is the application layer, or processor, which validates an event, and, depending on the state and type, takes an action on an event. After an event state is processed, a workflow is generated, and an event response is sent back to application (e.g., IoT AE). After the workflow is set to complete, the event state can be changed to generate a new instance of the event with the same correlation ID. The occurrence of the event, and corresponding data and metadata, are maintained in a database system (e.g., SAP HANA).

Figure 2:
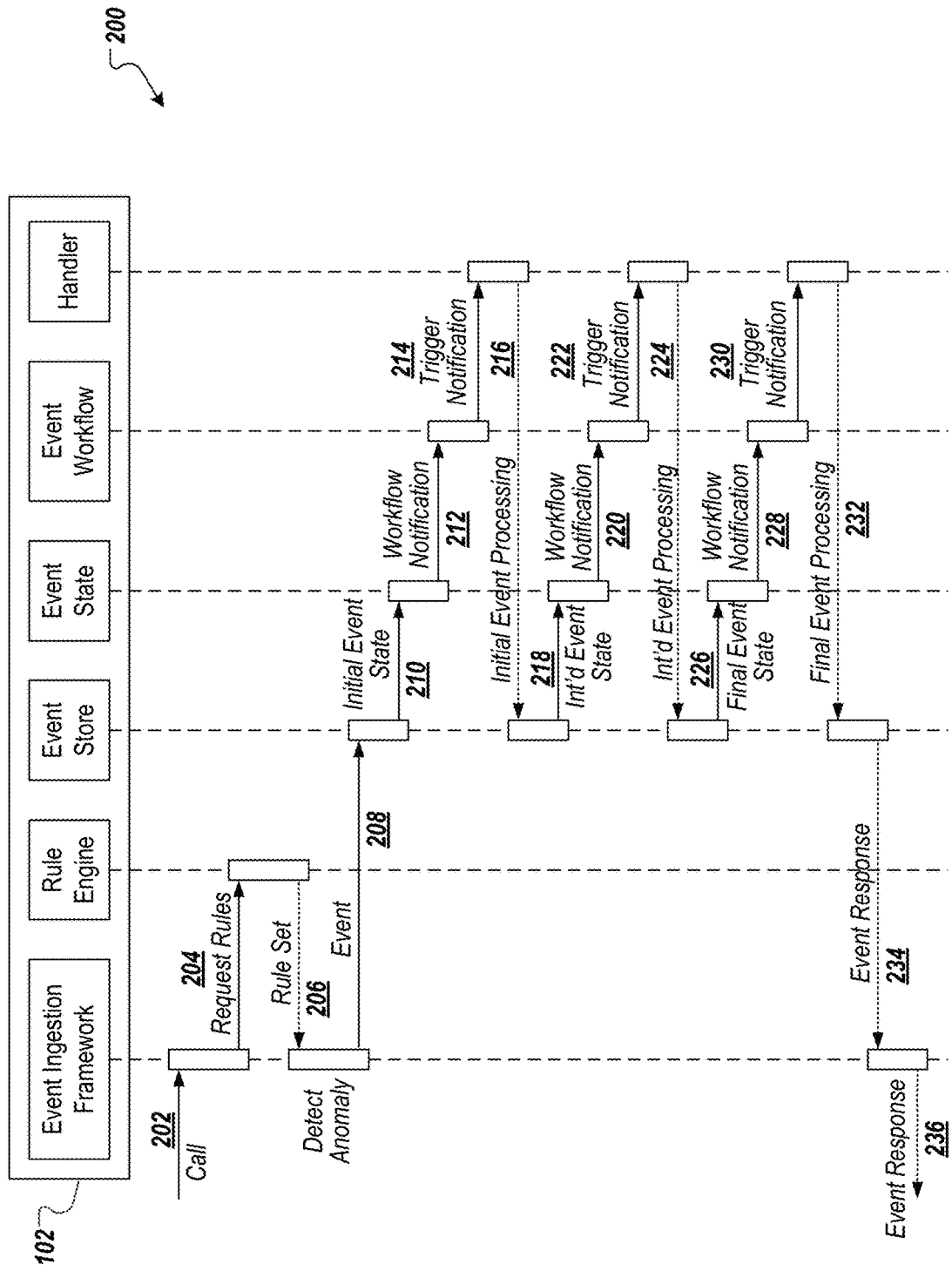
FIG. 2 depicts an example communication flow in accordance with implementations of the present disclosure.

FIG. 2 depicts an example communication flow 200 in accordance with implementations of the present disclosure. In the example of FIG. 2, a call is transmitted (202) to the UEF 102 (e.g., to the event ingestion framework of the UEF). In some examples, the call is provided from a cloud-based application (e.g., IoT AE) through an API. In some examples, the cloud-based application receives data from an IoT network (e.g., through a Kafka cluster), and provides the call to the UEF based on the data.

In some examples, in response to the call, the event ingestion framework sends a request (204) for a rule set that is to be used to process the data. A relevant rule set is returned (206), and the event ingestion framework processes the rules to detect any anomal(y/ies). If an anomaly is detected, an event is generated, and is transmitted (208) for processing. In the example of FIG. 2, the generated event is associated with multiple states, and an event workflow is performed to move the event from state to state. For example, an initial event state is provided (210) based on the configuration of the event, and an event workflow notification is sent (212). A respective workflow is provided for the given state (e.g., initial), and a trigger notification is issued (214) to trigger processing of the event (216).

In the example of FIG. 2, this process is repeated (218, 220, 222, 224; 226, 228, 230, 232) to move the event from the initial state to a final state. As the event is processed between states, if the event is defined as mutable, and whenever there is a state change, the event is updated with the same correlation ID it was assigned, and a new timestamp corresponding to the state change. As the event is processed between states, if the event is defined as immutable, and whenever there is a state change, a new event is generated and is assigned the same correlation ID as the originally generated event, and a new timestamp corresponding to the state change. After the final state is achieved, an event response is transmitted (234) to the event ingestion framework, which transmits (236) the event response back to the application (e.g., IoT AE) that had originally provided the call to the UEF.

Figure 3:
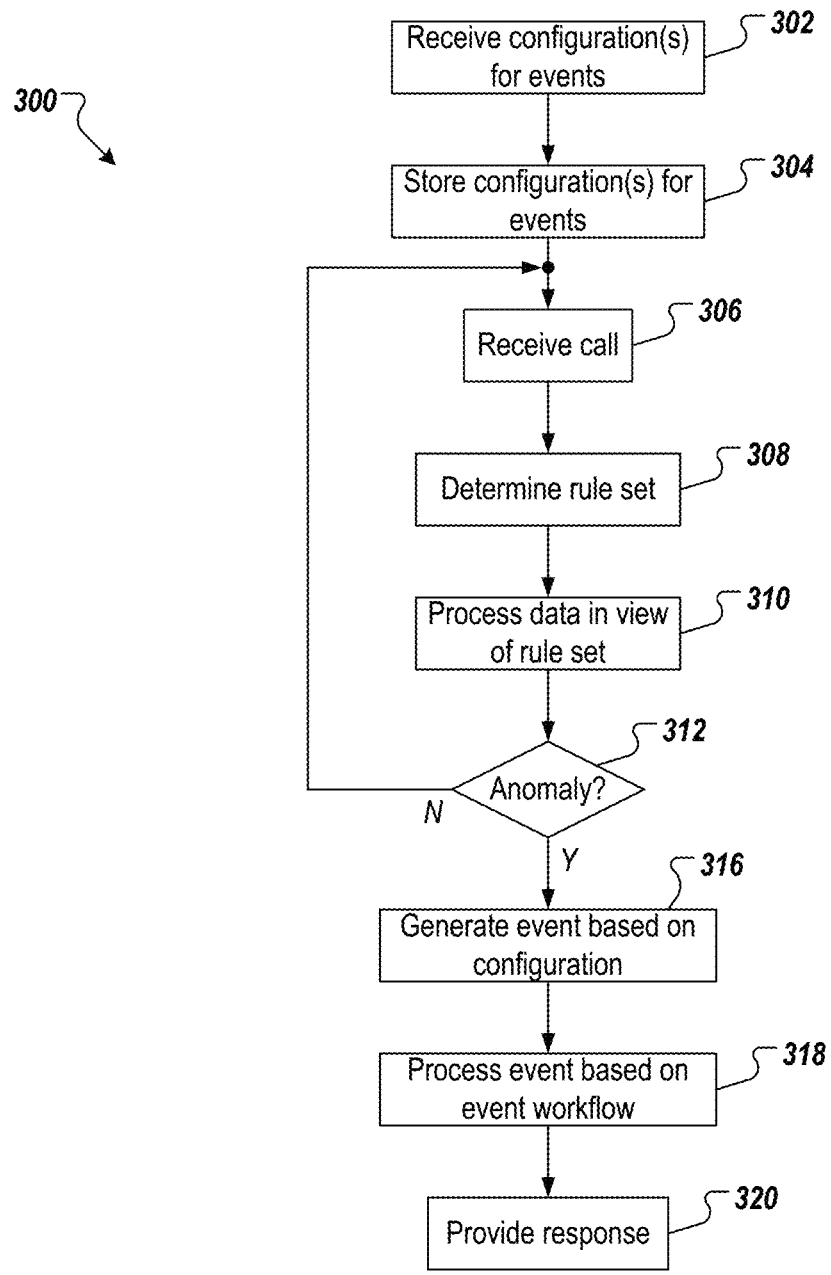
FIG. 3 depicts an example process that can be executed in accordance with implementations of the present disclosure.

FIG. 3 depicts an example processes 300 that can be executed in accordance with implementations of the present disclosure. In some examples, the example process 300 can be provided by one or more computer-executable programs executed using one or more computing devices.

One or more configurations for respective events are received (302). For example, one or more enterprises access the UEF 102 of FIG. 1 to define one or more event configurations. In some examples, the event configurations are industry-specific, and/or enterprise specific, as described herein. In some examples, each event configuration is encapsulated in a package that is associated with a respective enterprise. In this manner, in response to a call to the UEF 102 from the enterprise, a respective package can be selected, and event configuration applied to data included in the call. In some examples, and as described in detail herein, configuration is performed using the event configuration component 106, the event configuration metadata component 108, and event configuration data 116 of the UEF 102, which enable event modeling, and configuration. The one or more event configurations are stored (304).

A call is received (306). For example, a call is received from an application (e.g., IoT AE) associated with a respective enterprise. In some examples, the call includes data (e.g., timeseries data, sensor data) from an IoT network associated with the enterprise. In some examples, the call includes one or more identifiers that can be used to determine an event configuration that is to be applied, and/or one or more rule sets that are to be applied to the data. A rule set is determined (308). In some examples, the rule set can be determined based on an identifier provided with the call (e.g., an identifier identifying the enterprise, for which the data is to be processed).

The data is processed based on the rule set (310). For example, the data is processed through one or more rules included in the rule set to determine whether one or more anomalies are represented in the data. It is determined whether an anomaly has been detected (312). For example, the rules engine of the events ingestion framework 110 processes the data based on the rule set to determine whether an anomaly is present. If no anomaly is detected, the example process. In some examples, the response is provide back to the application that originated the call, and indicates that no anomaly is detected.

If an anomaly is detected, an event is generated based on the configuration originally defined by the enterprise (316). The event is processed based on a respective event workflow (318). For example, the events workflow management component 114 processes the event to transition the event between states (e.g., as described herein with reference to FIG. 2). An event response is provided (320). In some examples, the response is provide back to the application that originated the call, and indicates a resolution of, and/or current state of an event.

Figure 4:
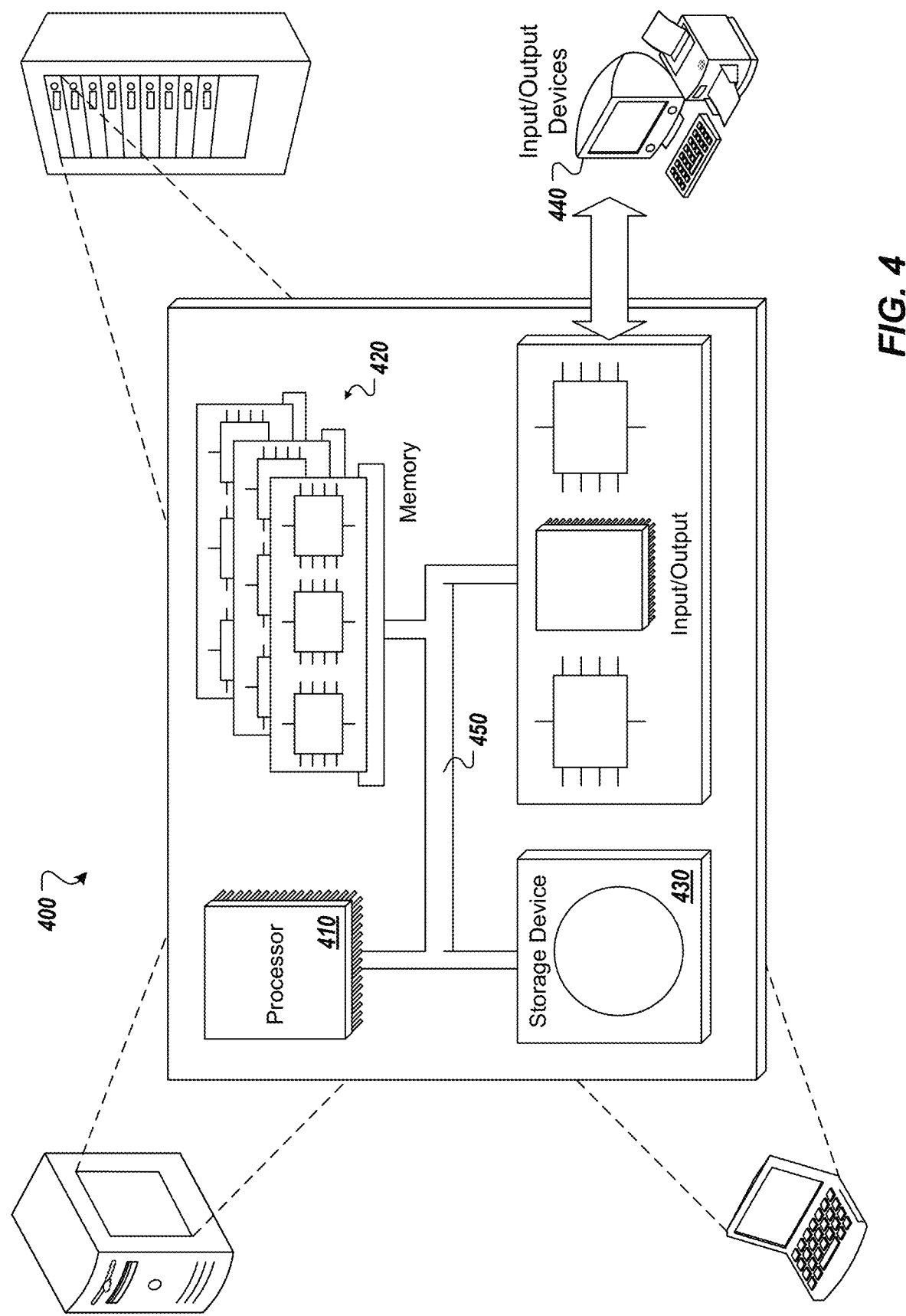
FIG. 4 is a schematic illustration of example computer systems that can be used to execute implementations of the present disclosure.

Referring now to FIG. 4, a schematic diagram of an example computing system 400 is provided. The system 400 can be used for the operations described in association with the implementations described herein. For example, the system 400 may be included in any or all of the server components discussed herein. The system 400 includes a processor 410, a memory 420, a storage device 430, and an input/output device 440. The components 410, 420, 430, 440 are interconnected using a system bus 450. The processor 410 is capable of processing instructions for execution within the system 400. In some implementations, the processor 410 is a single-threaded processor. In some implementations, the processor 410 is a multi-threaded processor. The processor 410 is capable of processing instructions stored in the memory 420 or on the storage device 430 to display graphical information for a user interface on the input/output device 440.

The memory 420 stores information within the system 400. In some implementations, the memory 420 is a computer-readable medium. In some implementations, the memory 420 is a volatile memory unit. In some implementations, the memory 420 is a non-volatile memory unit. The storage device 430 is capable of providing mass storage for the system 400. In some implementations, the storage device 430 is a computer-readable medium. In some implementations, the storage device 430 may be a floppy disk device, a hard disk device, an optical disk device, or a tape device. The input/output device 440 provides input/output operations for the system 400. In some implementations, the input/output device 440 includes a keyboard and/or pointing device. In some implementations, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for detecting and managing events from data of an Internet-of-Things (IoT) network, the method being executed by one or more processors and comprising:

providing a unified events framework that is accessible to each of a plurality of enterprises operating respective IoT networks, that is agnostic to the respective IoT networks and to enterprises operating the respective IoT networks, the unified events framework comprising an event configuration component and an event ingestion framework;

storing, by the unified events framework, one or more event configurations, each event configuration being customized by an enterprise of the plurality of enterprises through the event configuration component, each enterprise associated with a respective application, each event configuration being specific to a respective event and comprising an event type, one or more statuses defining respective states of the respective event, a severity and a code associated with one of messaging and notification of the respective event;

receiving, by the unified events framework, calls from respective applications of enterprises in the plurality of enterprises, the calls comprising a first call from a first application that executes functionality specific to a first enterprise of the plurality of enterprises, the first call comprising an identifier and timeseries data from one or more IoT devices in a first IoT network, the first IoT network being exclusive to the first enterprise, the identifier identifying the first enterprise among the plurality of enterprises;

retrieving, by the event ingestion framework of the unified events framework, a rule set for processing the timeseries data, the rule set being selected from a plurality of rule sets based on the identifier; and determining, by the event ingestion framework of the unified events framework, that an anomaly is represented in the timeseries data based on the rule set, and in response:

selecting a first event configuration from an event configuration data store of the unified events framework, the event configuration data store storing event configurations for each enterprise of the plurality of enterprises, the first event configuration being specific to the first enterprise and being distinct from a second event configuration that is specific to a second enterprise, generating an event based on the first event configuration that defines the event, executing an event workflow to transition the event between states, and transmitting an event response to the first application.

2. The method of claim 1, wherein the event is encapsulated in a package that defines the first event configuration, and comprises the event type, a property set, and a property set type of the event.

3. The method of claim 1, wherein the event type of the event is one of mutable, and immutable.

4. The method of claim 3, wherein during execution of the event workflow to transition the event between states, the event is mutable, and is overwritten at each state change.

5. The method of claim 3, wherein during execution of the event workflow to transition the event between states, the event is immutable, and a new event is generated and is correlated to the event at each state change.

6. The method of claim 1, further comprising receiving a second call from a second application that is different from the first application, the second call comprising timeseries data from one or more IoT devices in a second IoT network associated with a second enterprise that is different from the first enterprise.

7. The method of claim 1, wherein the first application is a cloud-based application.

8. A non-transitory computer-readable storage medium coupled to one or more processors and having instructions stored thereon which, when executed by the one or more processors, cause the one or more processors to perform operations for detecting and managing events from data of an Internet-of-Things (IoT) network, the operations comprising:

providing a unified events framework that is accessible to each of a plurality of enterprises operating respective IoT networks, that is agnostic to the respective IoT networks and to enterprises operating the respective IoT networks, the unified events framework comprising an event configuration component and an event ingestion framework;

storing, by the unified events framework, one or more event configurations, each event configuration being customized by an enterprise of the plurality of enterprises through the event configuration component, each enterprise associated with a respective application, each event configuration being specific to a respective event and comprising an event type, one or more statuses defining respective states of the respective event, a severity and a code associated with one of messaging and notification of the respective event;

receiving, by the unified events framework, calls from respective applications of enterprises in the plurality of enterprises, the calls comprising a first call from a first application that executes functionality specific to a first enterprise of the plurality of enterprises, the first call comprising an identifier and timeseries data from one or more IoT devices in a first IoT network, the first IoT network being exclusive to the first enterprise, the identifier identifying the first enterprise among the plurality of enterprises;

retrieving, by the event ingestion framework of the unified events framework, a rule set for processing the timeseries data, the rule set being selected from a plurality of rule sets based on the identifier; and determining, by the event ingestion framework of the unified events framework, that an anomaly is represented in the timeseries data based on the rule set, and in response:
  selecting a first event configuration from an event configuration data store of the unified events framework, the event configuration data store storing event configurations for each enterprise of the plurality of enterprises, the first event configuration being specific to the first enterprise and being distinct from a second event configuration that is specific to a second enterprise,
  generating an event based on the first event configuration that defines the event,
  executing an event workflow to transition the event between states, and
  transmitting an event response to the first application.

9. The computer-readable storage medium of claim 8, wherein the event is encapsulated in a package that defines the first event configuration, and comprises the event type, a property set, and a property set type of the event.

10. The computer-readable storage medium of claim 8, wherein the event type of the event is one of mutable, and immutable.

11. The computer-readable storage medium of claim 10, wherein during execution of the event workflow to transition the event between states, the event is mutable, and is overwritten at each state change.

12. The computer-readable storage medium of claim 10, wherein during execution of the event workflow to transition the event between states, the event is immutable, and a new event is generated and is correlated to the event at each state change.

13. The computer-readable storage medium of claim 8, wherein operations further comprise receiving a second call from a second application that is different from the first application, the second call comprising timeseries data from one or more IoT devices in a second IoT network associated with a second enterprise that is different from the first enterprise.

14. The computer-readable storage medium of claim 8, wherein the first application is a cloud-based application.

15. A system, comprising:
  a computing device; and
  a computer-readable storage device coupled to the computing device and having instructions stored thereon which, when executed by the computing device, cause the computing device to perform operations for detecting and managing events from data of an Internet-of-Things (IoT) network, the operations comprising:
    providing a unified events framework that is accessible to each of a plurality of enterprises operating respective IoT networks, that is agnostic to the respective IoT networks and to enterprises operating the respective IoT networks, the unified events framework comprising an event configuration component and an event ingestion framework;
    storing, by the unified events framework, one or more event configurations, each event configuration being customized by an enterprise of the plurality of enterprises through the event configuration component, each enterprise associated with a respective application, each event configuration being specific to a respective event and comprising an event type, one or more statuses defining respective states of the respective event, a severity and a code associated with one of messaging and notification of the respective event;
    receiving, by the unified events framework, calls from respective applications of enterprises in the plurality of enterprises, the calls comprising a first call from a first application that executes functionality specific to a first enterprise of the plurality of enterprises, the first call comprising an identifier and timeseries data from one or more IoT devices in a first IoT network, the first IoT network being exclusive to the first enterprise, the identifier identifying the first enterprise among the plurality of enterprises;
    retrieving, by the event ingestion framework of the unified events framework, a rule set for processing the timeseries data, the rule set being selected from a plurality of rule sets based on the identifier; and
    determining, by the event ingestion framework of the unified events framework, that an anomaly is represented in the timeseries data based on the rule set, and in response:
      selecting a first event configuration from an event configuration data store of the unified events framework, the event configuration data store storing event configurations for each enterprise of the plurality of enterprises, the first event configuration being specific to the first enterprise and being distinct from a second event configuration that is specific to a second enterprise,
      generating an event based on the first event configuration that defines the event,
      executing an event workflow to transition the event between states, and
      transmitting an event response to the first application.

16. The system of claim 15, wherein the event is encapsulated in a package that defines the first event configuration, and comprises the event type, a property set, and a property set type of the event.

17. The system of claim 15, wherein the event type of the event is one of mutable, and immutable.

18. The system of claim 17, wherein during execution of the event workflow to transition the event between states, the event is mutable, and is overwritten at each state change.

19. The system of claim 17, wherein during execution of the event workflow to transition the event between states, the event is immutable, and a new event is generated and is correlated to the event at each state change.

20. The system of claim 15, wherein operations further comprise receiving a second call from a second application that is different from the first application, the second call comprising timeseries data from one or more IoT devices in a second IoT network associated with a second enterprise that is different from the first enterprise.

* * * * *